Patented May 20, 1952

2,597,025

UNITED STATES PATENT OFFICE 2,597,025

POTENTIALLY REACTIVE AROMATIC DIISO-CYANATE-WATER RESINOUS REACTION PRODUCT AND METHOD OF PREPARING

George Otto Orth, Jr., Seattle, Wash., assignor to Armour and Company, Chicago, Ill., a corporation of Illinois No Drawing. Application September 13, 1947, Serial No. 773,937

9 Claims. (Cl. 260—77.5)

This invention relates to an adhesive and resin product and to the method of preparing the same. More particularly, the invention has to do with thermosetting and thermoset compositions useful for many purposes.

An object of the invention is to provide a thermosetting composition, which is useful as an adhesive, and a thermoset composition, which is useful as a resin-like compound for molding purposes, and other purposes. A further object is to provide a thermosetting adhesive rendered effective by the application of water so as to produce an unusually sturdy bond, the bond being formed in an extremely brief period. A further object is to provide a thermosetting composition which, in the course of setting, provides enough heat of reaction to promote essential complete polymerization without the application of external heat. Yet, another object is to provide a process for preparing a resin product, and also for preparing adhesives by employing new steps and ingredients combined in a novel manner. A further object is to provide methods of controlling the reaction between polyfunctional isocyanates and water that make possible the production of a new and useful series of thermosetting and thermoset polymers. Other specific objects and advantages will appear as the specification proceeds.

In one embodiment of the invention, I provide a polyfunctional isocyanate and preferably an aromatic diisocyanate with a small amount of water, and preferably with a solvent which dissolves both the isocyanate and water. Such a mutual solvent for the isocyanate and water may be an acidic or basic material. The reacted combination between the polyfunctional isocyanate and water in the presence of the solvent forms a stable liquid, which on later contact with sufficient water in the presence of an acid or a base, will cause the polyisocyanate to set to an infusible, insoluble material. The acid or base is preferably formed by the ionization of the mutual solvent for the polyfunctional isocyanate and water, although the acid or base may be added, as such, to either the water or the isocyanate solution. The preliminary reaction of the isocyanate with a small amount of water is not necessary for the production of a thermoset reaction, but is a desirable feature in some of the uses to which this reaction may be put. The process may be carried through under certain conditions to provide a thermosetting composition, and under other conditions, to provide a thermoset or resin product.

A solution suitable for the preparation of an adhesive capable of thermosetting on contact with water, and especially suitable as a contact adhesive whereby one face of the wood may be coated with "A" stage polymer and the other moistened with or containing water sufficient to complete the cross-linking of the resin solution, may be prepared as follows: A polyfunctional isocyanate may be mixed with a solvent which will dissolve the partially polymerized isocyanate and water and which is preferably ionizable to an acid or base in the presence of water. The solvent must be non-reactive with the isocyanates. For example, the polyfunctional isocyanate and pyridine, in equal proportions, may be placed in a flask equipped with a stirrer, reflux condenser, thermometer, and dropping funnel, and brought to a temperature of about 100° C. over a water bath. To the mixture, I prefer to add from 0.3 to 0.6 mole of water based upon the polyfunctional isocyanate as one mole. Mixed with the added water, I add another mole of pyridine, and the mixture is added dropwise, care being taken to add the material slowly and at a constant rate, taking the heat of reaction away with the water bath and keeping the reaction temperature around 95° C. plus or minus 5° C. Immediately upon the completion of the water and pyridine addition, the resin is poured into dark-colored bottles and sealed against air or moisture and further protected against heat and strong light.

In the above process, the pyridine is set out merely as an example. It will be understood that any mutual solvent of the water and polyfunctional isocyanate may be employed, and preferably one which, when water is added, will ionize, causing the isocyanate to polymerize. For example, there may be employed an alkyl-substituted pyridine or pyrrole or a hexahydro-pyridine or tetrahydro-pyrrole or alkyl-substituted hexahydro-pyridine or tetrahydro-pyrrole, or any alkyl, or aryl mono, di, or triamine or mono, di, or polyamine hydrocarbon which, when water is added, will ionize, causing the isocyanate to polymerize.

For the polyfunctional isocyanate reactant, I prefer to employ aromatic diisocyanates.

Instead of the pyridine added with the water in the second step of the process, there may be employed any mutual solvent, preferably non-reactive for the isocyanate, the pyridine mutual solvent, or the water or its equivalent, but which will dilute the reaction of the water on addition to the isocyanate and the solvent.

The proportions employed are important. For one mole of the polyisocyanate, I prefer to use from 0.3 to 0.6 mole of water. The mutual solvent may be used in the ratio of 0.10 mole to 10 moles to one mole of the polyisocyanate. It should be used in sufficient quantity to easily control the reaction and to keep ionization and mutual solubility with the polyisocyanate and water.

The reaction temperatures may be varied over wide limits. In the preparation of the adhesive, I prefer to maintain the temperatures between 70° C. and 100° C.

A specific example of the process may be set out as follows: One mole of toluene 2,4, diisocyanate, or polymerized toluene 2,4 diisocyanate was mixed with one mole of pyridine, placed in a flask equipped with stirrer, reflux condenser, thermometer and dropping funnnel, and placed on a water bath at 100° C. A mixture of 0.6 mole of water and one mole of pyridine was then added dropwise, care being taken not to react too fast and to keep adding at a constant rate, taking the heat of reaction away with the water bath and keeping reaction temperature at 95° C., plus or minus 5° C. The resin was poured immediately on the completion of the water-pyridine addition into dark-colored bottles, sealed against air or moisture, and protected against heat and strong light.

When resin products, other than an adhesive, are to be formed, the proportion of water employed may be varied from the proportions given above. For example, the water may vary from 0.10 mole to 0.90 mole. I find that when the proportion of water drops below 0.4 mole based upon the polyisocyanate as one mole, that crystalline products are obtained. These products may be reacted in the presence of aluminum hydroxide or clay to form molding compounds. I find further that when the temperature of reactions runs below 70° C., the polymerization tends to be incomplete and crystalline matter settles out in a few hours. The crystalline material may be separated by filtration and used as a molding material by mixing with polyhydroxy compounds, such as polyvinyl alcohol, glycerin, glucose, cellulose, or inorganic hydroxides, such as aluminum hydroxide, etc.

The resins formed by the reactions of polyisocyanates, water, and the solvents, may be vacuum-distilled to form resin solids which are thermoplastic and can be cured to thermosetting or thermoset material by either water, formaldehyde, or other material having an active hydrogen. These resins may be drawn into fibers to form staple or filament fibers.

The resin solution heretofore described may also be used to impregnate cloth or paper or fibers and to prepare laminate, sheet, tube and rod stock. The resin solutions may be used in low-pressure lamination work with great advantages, because of the cold setting properties and the ability of the resin solutions to form stable foams on contact with water.

The resin solutions may be used as varnishes and as protective coatings, the principal advantage of such solutions being that they can dry in moist air to cure, to thermoset resins in from 30 to 60 seconds depending on the humidity.

The liquid adhesive prepared as described above from polyisocyanate, water, and mutual solvent, is unusually quick in forming a sturdy bond upon the application of water. For example, if two wood surfaces are joined by coating one surface with the resin solution and the other surface with water, the setting of the resin solution is accomplished in about 30 seconds, and the resulting bond is so sturdy that it offers greater resistance to breaking than the wood itself. The mutual solvent is useful in that it maintains the polyisocyanate and small quantity of water in a liquid phase and enables the material to be readily applied. The initial reaction caused by adding the small percentages of water, say, from 0.3 to 0.6 mole, gives the resultant liquid sufficient body to enable it to be applied readily to the surface of wood, etc. Later, the application of a larger quantity of water results in an almost instantaneous setting of the resin solution. An explanation as to why the results occur as described above cannot positively be set forth. It is believed that the solvent is not reactive, but that upon the application of water it becomes effective as a catalyst and thus brings about the quick cross-linking of the resin solution.

The solvents, such as pyridine, etc., ionize in the presence of water to form a basic material, and it is this basic material which promotes the polymerization of the polyfunctional isocyanate and water. It will be understood that the same result can be accomplished if a non-reactive mutual solvent for water and the polyisocyanate were added, and then an alkaline or acid catalyst added to either part of the solution.

Whether or not the mutual solvent be employed, the polyfunctional isocyanate, when combined with the critically small amounts of water indicated in the preliminary reaction, produces an adhesive which becomes highly effective when a greater quantity of water is later added for producing the sturdy bond described.

While in the foregoing specification, I have set forth various steps in great detail, it will be understood that such details may be varied widely by those skilled in the art without departing from the spirit of my invention.

I claim:

1. A potentially reactive resinous mass formed by reacting one mole of an aromatic diisocyanate with from 0.1 to 0.9 mole of water in the presence of a liquid reaction medium, which is a mutual solvent for both said aromatic diisocyanate and water and which is a compound containing solely carbon, hydrogen, and nitrogen and which will ionize in the presence of water to form a basic material, said reaction medium being employed in the proportion of 0.1 to 10 moles per each mole of the aromatic diisocyanate, and said resinous mass being capable of setting without the application of heat to an infusible, insoluble material upon mixing with water.

2. A potentially reactive resinous mass formed by reacting one mole of an aromatic diisocyanate with from 0.3 to 0.6 mole of water in the presence of a liquid reaction medium, which is a mutual solvent for both said aromatic diisocyanate and water and which is a compound containing solely carbon, hydrogen, and nitrogen and which will ionize in the presence of water to form a basic material, said reaction medium being employed in the proportion of 0.1 to 10 moles per each mole of the aromatic diisocyanate; and said resinous mass being capable of setting without the application of heat to an infusible, insoluble material upon mixing with water.

3. A potentially reactive resinous mass formed by reacting one mole of an aromatic diisocyanate with from 0.3 to 0.6 mole of water in the presence of a liquid reaction medium, which is a mutual solvent for both said aromatic diisocyanate and water and which is a compound containing solely carbon, hydrogen, and one nitrogen atom per molecule and which will ionize in the presence of water to form a basic material, said reaction medium being employed in the proportion of 0.1 to 10 moles per each mole of the aromatic diisocyanate, and said resinous mass being capable of setting without the application of heat to an infusible, insoluble material upon mixing with water.

4. A potentially reactive resinous mass formed by reacting one mole of toluene 2,4-diisocyanate with from 0.3 to 0.6 mole of water in the presence of a liquid reaction medium, which is a mutual solvent for both said tolene 2,4-diisocyanate and water and which is a compound containing solely carbon, hydrogen, and nitrogen and which will ionize in the presence of water to form a basic material, said reaction medium being employed in the proportion of 0.1 to 10 moles per each mole of the toluene 2,4-diisocyanate, and said resinous mass being capable of setting without the application of heat to an infusible, insoluble material upon mixing with water.

5. A potentially reactive resinous mass formed by reacting an aromatic diisocyanate with water, the proportion of water being from 0.3 to 0.6 mole for each mole of the aromatic diisocyanate, in the presence of from 0.1 to 10 moles of pyridine per each mole of the aromatic diisocyanate, said resinous mass being capable of setting without the application of heat to an infusible, insoluble material upon mixing with water.

6. A potentially reactive resinous mass formed by reacting toluene 2,4-diisocyanate with water, the proportion of water being from 0.3 to 0.6 mole for each mole of the toluene 2,4-diisocyanate, in the presence of from 0.1 to 10 moles of pyridine per each mole of toluene 2,4-diisocyanate, said resinous mass being capable of setting without the application of heat to an infusible, insoluble material upon mixing with water.

7. The resinous mass of claim 6 formed from the reaction in which the pyridine is present in approximately equi-molar proportions to the toluene 2,4-diisocyanate.

8. In a process for preparing a potentially reactive resinous mass capable of setting without the application of heat to an infusible, insoluble material by the addition thereto of water, the steps of preliminarily reacting an aromatic diisocyanate with water, the proportion of the water being from 0.3 to 0.6 mole to one mole of the aromatic diisocyanate, in the presence of a liquid reaction medium which is a mutual solvent for both said aromatic diisocyanate and water and which is a compound containing solely carbon, hydrogen, and one nitrogen atom per molecule and which will ionize in the presence of water to form a basic material, said reaction medium being in the proportion of 0.1 to 10 moles per mole of the aromatic diisocyanate.

9. In a process for preparing a potentially reactive resinous mass capable of setting without the application of heat to an infusible, insoluble material by the addition thereto of water, the steps of preliminarily reacting an aromatic diisocyanate with water, the proportion of the water being from 0.3 to 0.6 mole to one mole of the aromatic diisocyanate, in the presence of a liquid reaction medium which is a mutual solvent for both said aromatic diisocyanate and water and which is a compound containing solely carbon, hydrogen, and one nitrogen atom per molecule and which will ionize in the presence of water to form a basic material, said reaction medium being in the proportion of 0.1 to 10 moles per mole of the aromatic diisocyanate.

GEORGE OTTO ORTH, JR.

REFERENCES CITED

The following references are of record in the file of this patent:

UNITED STATES PATENTS

| Number | Name | Date |
| --- | --- | --- |
| 1,875,452 | Hartmann | Sept. 6, 1932 |
| 2,266,777 | Lieser | Dec. 23, 1941 |
| 2,277,083 | Dorough | Mar. 24, 1942 |
| 2,284,895 | Hanford et al. | June 2, 1942 |
| 2,292,443 | Hanford | Aug. 11, 1942 |
| 2,415,839 | Neal | Feb. 18, 1947 |
| 2,417,792 | Verbane | Mar. 18, 1947 |
| 2,468,713 | Kropa | Apr. 26, 1949 |

OTHER REFERENCES

De Bell et al., German Plastics Practice, 1946, pp. 312, 316, 463, 464. (Copy in Div. 50.)

Office of Technical Services, Wash., D. C., PB 45246, Jan. 31, 1947, "Interview with Prof. Otto Bayer," 25 cents.

Curtius et al., J. F. Praktische Chemie, vol. 105, 1922, pp. 289, 316, 317. (Copy in S. L.)

Schmidt, Berichte Deut. Chem. Gesel., vol. 55, 1922, pp. 1584, 1587. (Copy in S. L.)